United States Patent [19]
Adsit et al.

[11] Patent Number: 6,120,076
[45] Date of Patent: Sep. 19, 2000

[54] VEHICLE CARGO BED EXTENDER AND DIVIDER

[75] Inventors: Daniel Mark Adsit; Milton D Wong, both of Ann Arbor, Mich.

[73] Assignee: Ford Global Technologies, Inc., Dearborn, Mich.

[21] Appl. No.: 09/143,783

[22] Filed: Aug. 31, 1998

[51] Int. Cl.[7] .................................................. B62D 33/08
[52] U.S. Cl. ...................... 296/26.11; 296/57.1; 296/37.6
[58] Field of Search .................................. 296/39.1, 39.2, 296/37.6, 57.1, 26.11, 26.08, 26.09, 26.1; 410/129, 121, 130, 142, 141

[56] References Cited

U.S. PATENT DOCUMENTS

| | | | |
|---|---|---|---|
| 2,872,239 | 2/1959 | Bowness et al. | |
| 3,044,800 | 7/1962 | Wicker | 280/748 |
| 4,472,639 | 9/1984 | Bianchi | |
| 4,531,773 | 7/1985 | Smith | |
| 4,778,213 | 10/1988 | Palmer | |
| 5,167,479 | 12/1992 | Bott | 410/121 |
| 5,265,993 | 11/1993 | Wayne | 296/39.2 |
| 5,421,634 | 6/1995 | Hackett | 296/39.2 |
| 5,456,511 | 10/1995 | Webber | 296/26 |
| 5,522,685 | 6/1996 | Lessard | 410/121 |
| 5,658,033 | 8/1997 | Delaune | 296/26 |
| 5,700,047 | 12/1997 | Leitner et al. | 296/26 |
| 5,800,145 | 9/1998 | Kelce | 410/142 |
| 5,816,637 | 10/1998 | Adams et al. | 296/26.09 |
| 5,816,638 | 10/1998 | Pool, III | 296/26.11 |

FOREIGN PATENT DOCUMENTS 6-247211  9/1994  Japan.

*Primary Examiner*—D. Glenn Dayoan
*Assistant Examiner*—Patricia Engle
*Attorney, Agent, or Firm*—David B. Kelley

[57] ABSTRACT

The cargo space of a vehicle bed bounded by a flatbed, a tailgate, and opposed rear quarter panels is increased by extending two side enclosure members, each encased within a quarter panel, to connect with a rear enclosure member which swings into an upright position from a flat position on the tailgate. The cargo space is divided by a divider located between the vehicle cab and the tailgate.

9 Claims, 9 Drawing Sheets

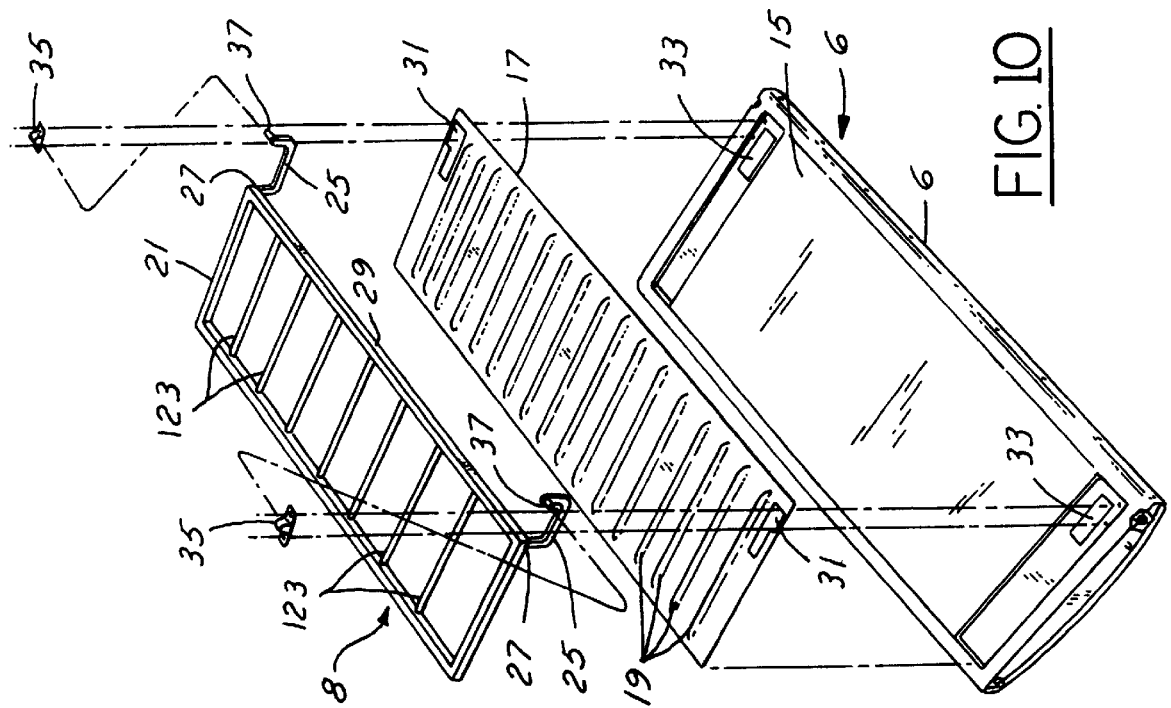
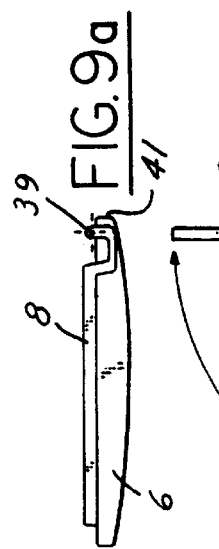
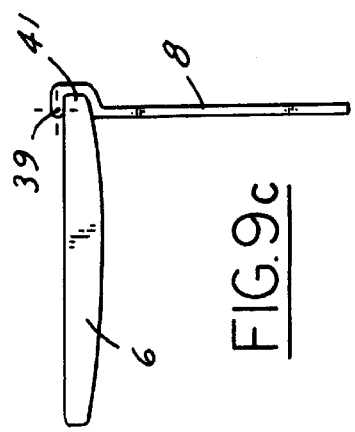

VEHICLE CARGO BED EXTENDER AND DIVIDER

FIELD OF THE INVENTION

The present invention relates to vehicles with a bed for carrying cargo. More particularly, the present invention relates to a novel structure designed to increase the carrying capacity of a vehicle bed.

BACKGROUND OF THE INVENTION

Vehicles having drop-down type tailgates and a vehicle bed, such as pickup trucks, are commonly used to transport large, often heavy, objects such as lumber, furniture, and machinery. In practice, such objects often exceed the length of the vehicle bed and when placed therein extend over the tailgate. Such a situation may result in an awkward load, a situation which is preferably avoided.

One solution to this problem is to provide a larger vehicle bed. However, increasing the length of the bed must be weighed against other vehicle design objectives, such as the desire to have a vehicle which is short enough, from front bumper to rear bumper, to fit into most garages and parking spaces. Accordingly, there is a need for a vehicle structure that provides a temporary increase in space for a vehicle bed which restrains cargo from exiting the bed during vehicle operation.

A number of such structures have been proposed in the past. For example, U.S. Pat. No. 2,872,239 (Bowness et al.) discloses side panels 19, 21 that are hinged to the sides of panel 17 which pivoted to tailboard 15. The side panels 19, 21 are attached to the side walls 11,12 of the truck body to enlarge the capacity of the truck bed. In U.S. Pat. No. 4,472,639 (Binchi), a panel 17 is pivoted to the uppermost portions of tailgate 15. Side panels 19, 21 are hinged to panel 17 and positioned parallel to the truck pickup body. The panels 17, 19, 21 are unfolded to form a bed extension. The U.S. Pat. No. 4,531,773 (Smith) discloses enlarging the size of a truck bed by pivoted panels which unfold and slide along guides 28, 30. These patents, however, have various complications and disadvantages, such as difficulty in assembling the devices, the space taken up by storage of the devices when not in use, and the weight of the devices on the tailgate, and therefore have restricted usage.

SUMMARY OF THE INVENTION

The present invention overcomes the aforementioned disadvantages by providing a new and improved vehicle bed bounded by a flatbed, a tailgate, and two side walls together with a novel bed extension. The flatbed is generally horizontal and is bounded by a pair of opposed side walls on transversely opposite sides of the flatbed. The tailgate is rotatably disposed on the flatbed to allow access to the interior of the vehicle bed. The vehicle bed also includes a rear enclosure member and two side enclosure members, which enable the extension of the available cargo space of the vehicle bed. The rear enclosure member is disposed on the tailgate, and is able to move between a position parallel to the tailgate and a position perpendicular to the tailgate. The side enclosures are able to move between a stowed position encased by the side walls of the vehicle bed, and a deployed position extending from the side walls. The vehicle bed further includes means for connecting the side enclosures to the rear enclosure.

In one aspect of the present invention, the vehicle bed additionally includes a divider. The divider is disposed on the flatbed and is located between the tailgate and the rearmost portion of the vehicle cab. The divider is able to move between a bed position generally parallel with the flatbed and a dividing position generally perpendicular to the flatbed so as to divide the vehicle bed into two separate cargo spaces.

An advantage of the present invention is that the cargo space of the vehicle bed may be extended when desired.

Another advantage of the present invention is that assembly of the extended vehicle bed is simple to accomplish.

Yet another advantage of the present invention is that the cargo space of the vehicle may be efficiently utilized.

Still another advantage of the present invention is that side enclosure members may be stored in the sides of the vehicle bed to prevent excess weight on the tailgate.

Yet still another advantage of the present invention is a vehicle bed extension device made of components which are lightweight and which do not excessively load the tailgate.

A feature of the present invention is vehicle bed extension device with barred enclosure panels which reduce the weight of the panels on the tailgate and which increase the aerodynamic efficiency of the vehicle when in operation by allowing airflow therethrough.

Another feature of the present invention is a vehicle bed extension device with side panels stowable in side quarter panels of the vehicle.

Yet another feature of the present invention is a vehicle bed divider which rotates between a bed position parallel with the vehicle bed and a dividing position within the vehicle bed so as to divide the vehicle bed cargo space into smaller sections.

BRIEF DESCRIPTION OF THE DRAWINGS

These and other objects, advantages, and features of the present invention will be apparent to those skilled in the art upon reading the following description with reference to the accompanying drawings, in which:

FIGS. 9a, 9b, and 9c are side schematic views of the rear enclosure member in the flat, upright, and load positions, respectively;

FIG. 10 is an exploded, perspective view of the tailgate, tailgate liner, and rear enclosure member of a preferred embodiment of the present invention;

DETAILED DESCRIPTION OF THE PREFERRED EMBODIMENT

Figure 1:
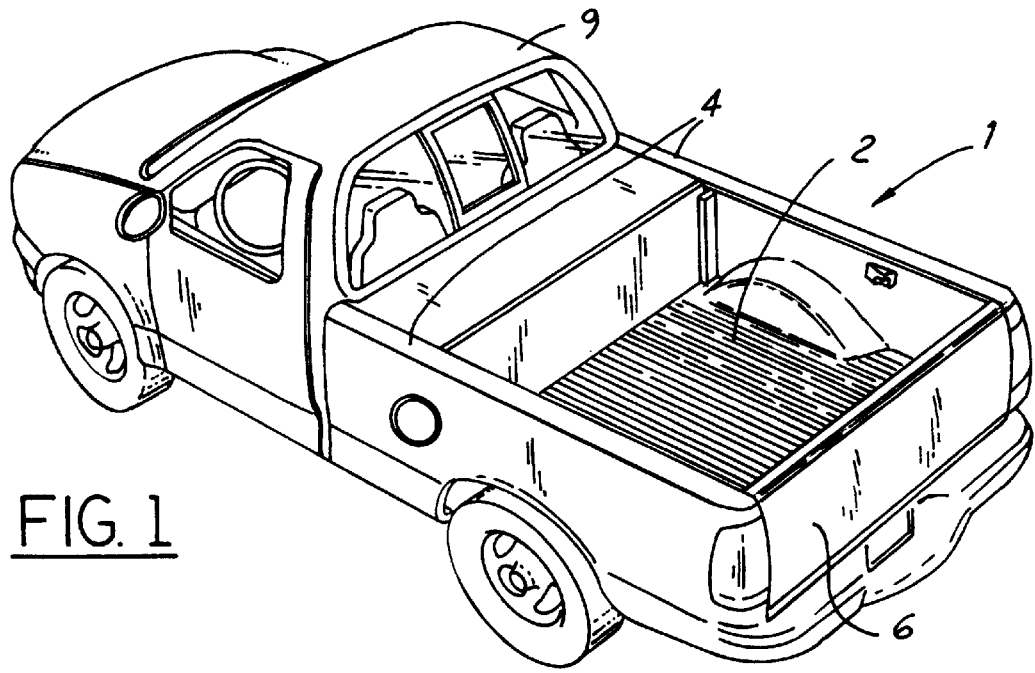
FIG. 1 is an elevational view of a vehicle having a cargo be which may be extended by the present invention.
Figure 2:
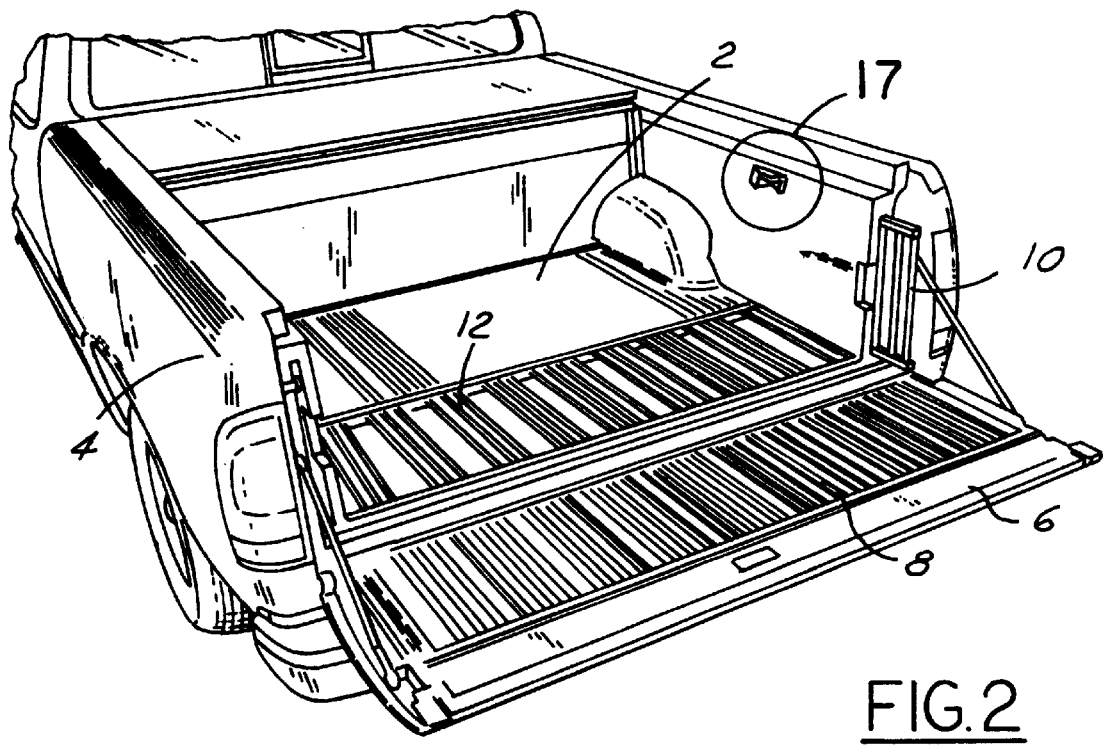
FIG. 2 is an elevational, exploded view of the present invention.

Referring now to FIGS. 1 and 2, a vehicle bed 1 of the present invention includes a generally horizontal, longitudinally extending flatbed 2 bounded by a pair of opposed side walls 4 on transversely opposite sides of the flatbed 2, and a tailgate 6 rotatably disposed on a rear of the flatbed 2 to allow access to an interior of the vehicle bed by moving from a generally vertical latched position (FIG. 1) to a rearwardly projecting generally horizontal unlatched position (FIG. 2), the side walls and tailgate defining boundaries of said vehicle bed when said tailgate is in the latched position.

Figure 3:
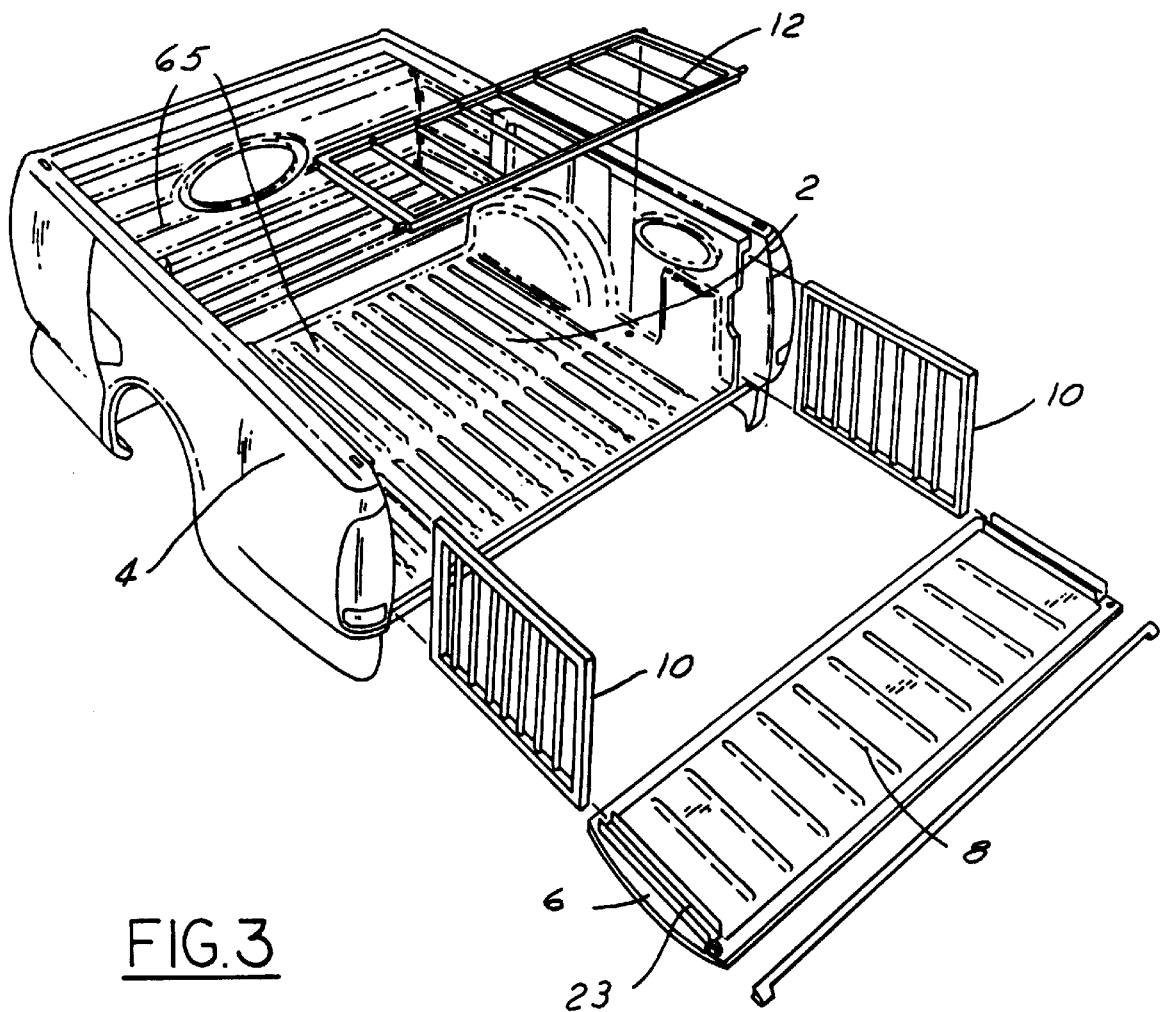
FIG. 3 is a rear view of a vehicle bed of the present invention showing the tailgate in an unlatched position, a rear enclosure member in a flat position, and a divider in bed position.
Figure 4:
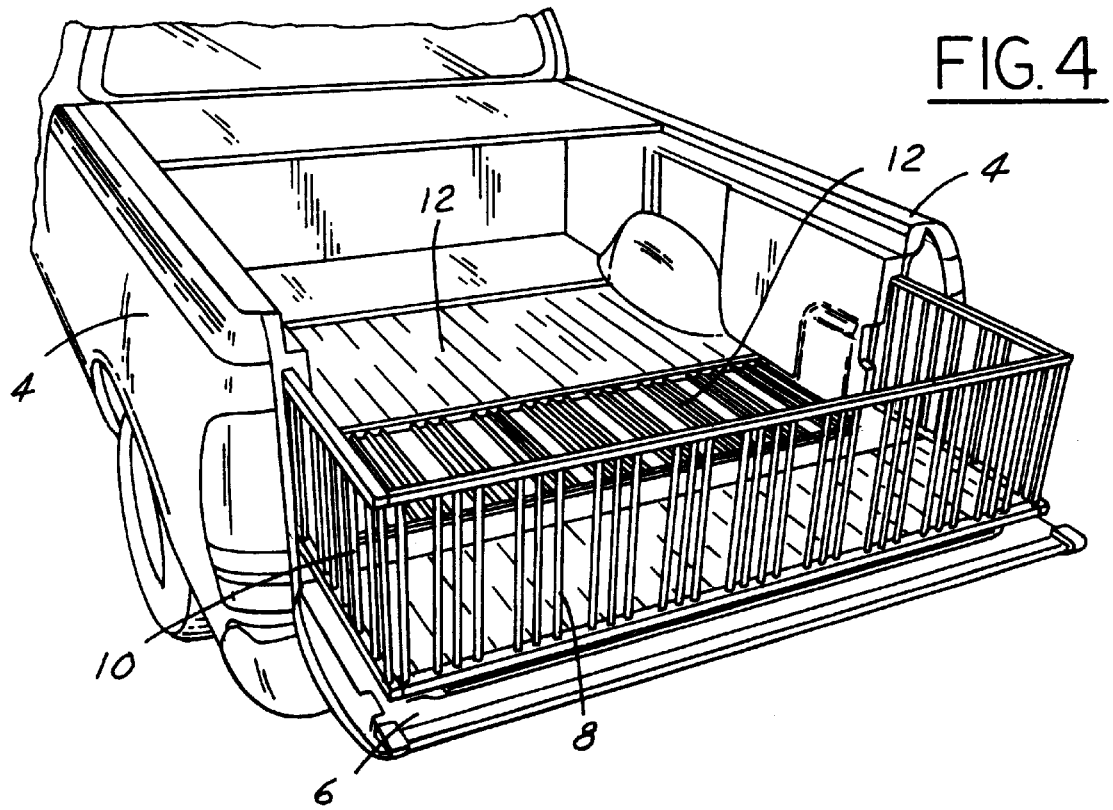
FIG. 4 is a perspective, rear view of a vehicle bed according to the present invention showing rear and side enclosure members in upright and deployed positions, respectively, so as to extend the vehicle bed cargo space.
Figure 5:
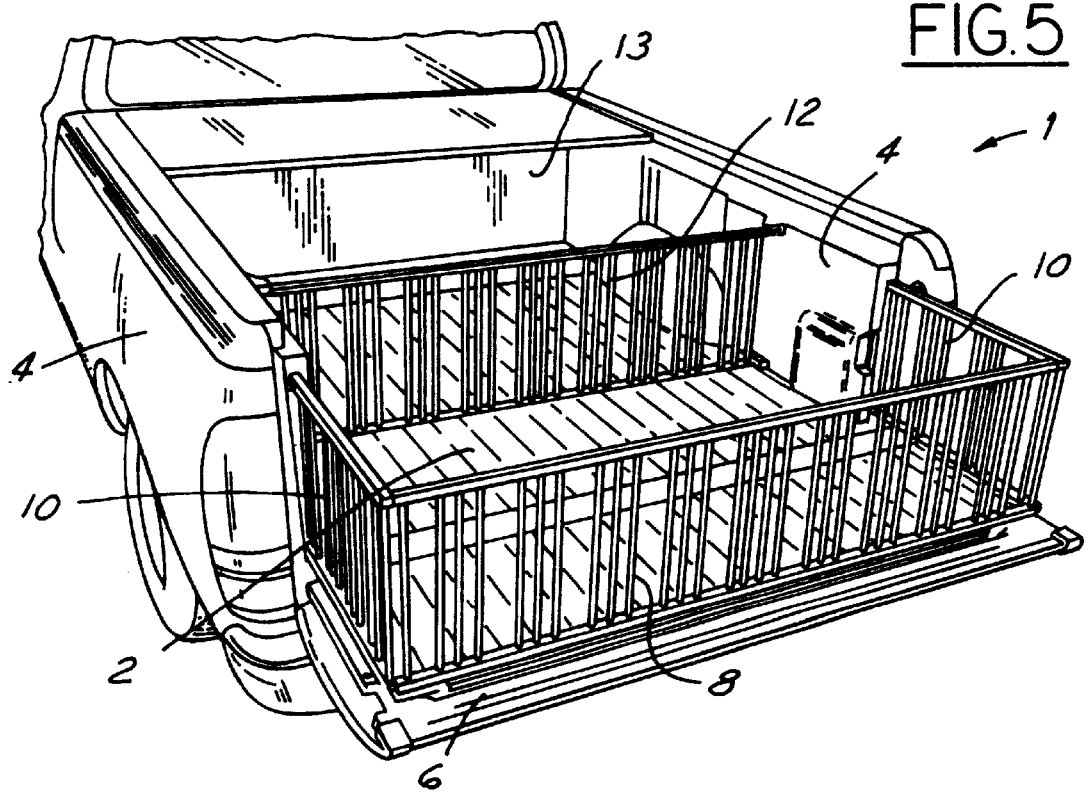
FIG. 5 is a perspective view similar to FIG. 4 but additionally showing a divider in a dividing position so as to divide the vehicle bed into smaller cargo spaces.

To extend and divide the above described vehicle bed 1, the present invention includes rear enclosure member 8, side enclosure members 10, and divider 12 (FIGS. 3–5). When in the bed and stowed positions, the divider and enclosure members, respectively, are positioned as seen in FIG. 3. Rear enclosure 8 lies parallel to tailgate 6 in a flat position, intertwined with the projections and recesses of the corrugation of tailgate 6. Side enclosures 10 are encased inside side walls 4 when in the stowed position. Divider 12 lies parallel to flatbed 2, intertwined with the projections and recesses of the corrugation of flatbed 2, when in a bed position.

Figure 6:
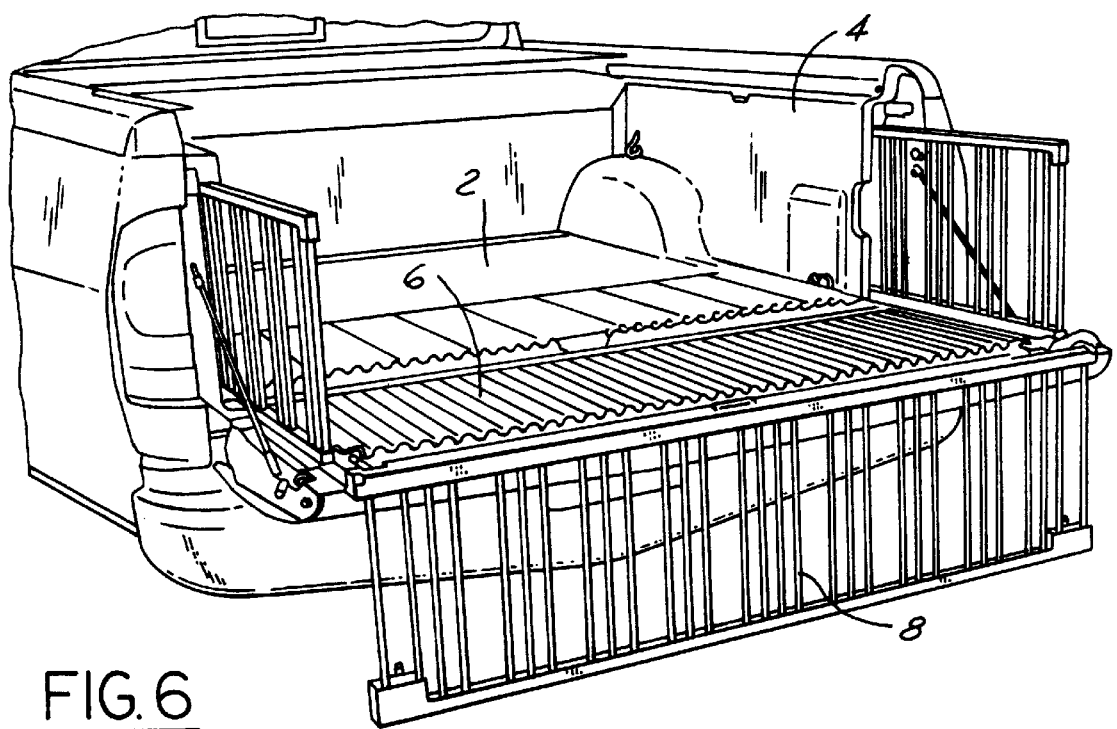
FIG. 6 is a perspective rear view of a vehicle bed according to the present invention similar to FIG. 4 but showing the rear enclosure member in a load position.

When in upright and deployed positions, the side and rear enclosure members 8, 10, respectively, are positioned as seen in FIGS. 4 and 5. In the upright position, rear enclosure member 8 is generally vertical and perpendicular to tailgate 6, providing a physical barrier between the cargo space of the vehicle bed and the outside environment. Side enclosures 10 provide containment of cargo when extended, for example by sliding on a track 23 (FIGS. 8 and 12), from side walls 4 to the extended position to meet rear enclosure 8 (FIG. 6). The divider 12 is movable from the bed position (FIG. 4) to a dividing position (FIG. 5). In the dividing position, divider 12 is generally vertical and perpendicular to flatbed 2, located longitudinally between tailgate 6 and a forward wall 13 of the bed 1.

The rear enclosure 8 may be moved to a hanging, or load position, rotated approximately 270° from the flat position, generally perpendicular to and downwardly extending from the tailgate 6 when in the unlatched position. Such a position is useful when loading cargo into the vehicle bed 1. FIGS. 9a–9c show the flat position, the upright position, and the load position, respectively, of the rear enclosure member 8. Construction of a preferred embodiment of the rear enclosure 8 is shown in FIG. 10. The tailgate 6 has an inner surface 15 upon which is mounted a tailgate inner panel 17 having generally longitudinally extending corrugations 19. The rear enclosure 8, which preferably has a rectangular frame 21 with longitudinally extending bars 123 therein for mating with the corrugations 19, is mounted to the tailgate 6 for rotation by J-hooks 25 attached at the corners 27 of a bottom member 29 of the frame 21. The J-hooks 25 fit through openings 31, 33 in the inner panel 17 and tailgate 6, respectively, and mount to brackets 35 on the tailgate 6 via pins 37, thus defining an axis of rotation 39 along the upper edge 41 of the tailgate 6 (FIGS. 9a–9c).

Figure 11:
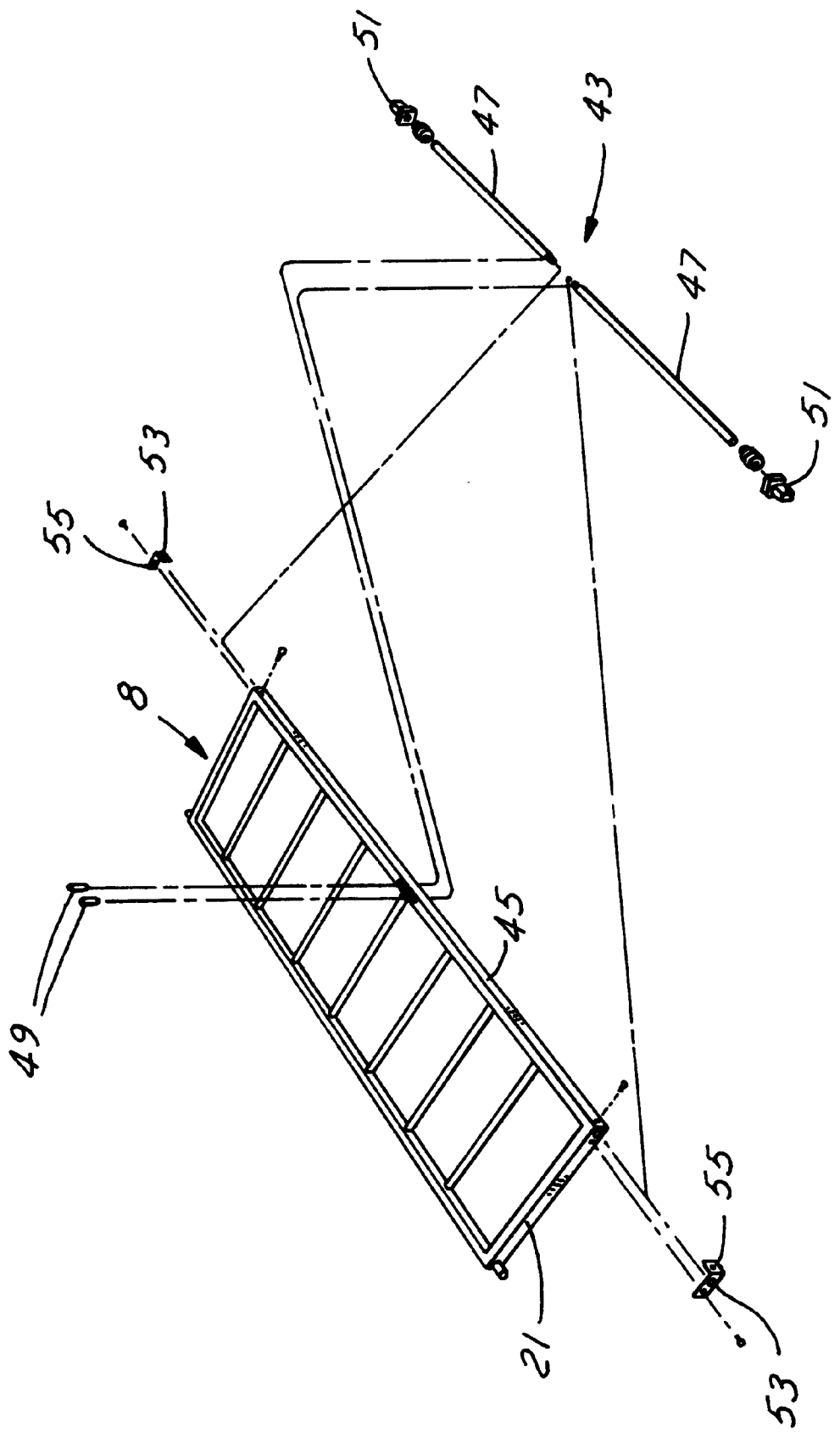
FIG. 11 is a perspective view of a rear enclosure latching mechanism according to one embodiment of the present invention.

The rear enclosure member 8 has a latching mechanism 43 within an upper member 45 of the frame 21 (FIG. 11). The latching mechanism 43 has a pair of coaxial rods 47 extending in opposite directions generally along the upper member 45 from a pair of push-pins 49 protruding from the upper member 45. The rods 47 move spring loaded tabs 51 through openings 53 in brackets 55 on corners 57 of the upper member 45 and into slots (not shown) in the tailgate 6 to lock and unlock the rear enclosure member 8.

Figure 7:
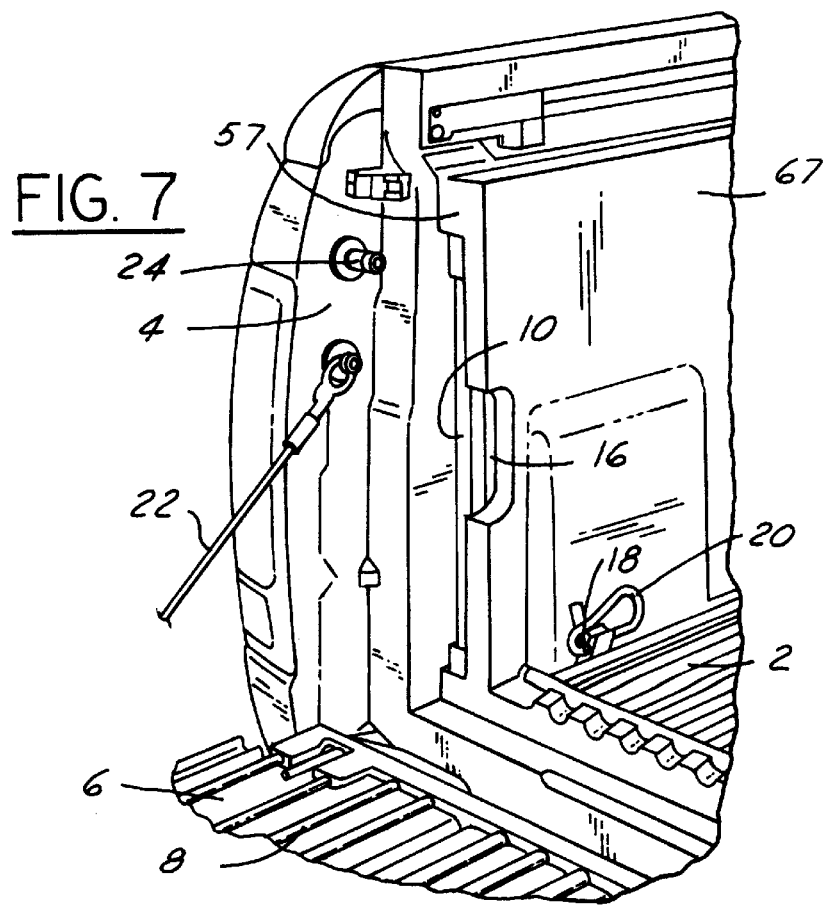
FIG. 7 is a partial rear view of the present invention showing the tailgate in the unlatched position and a side enclosure member in a stowed position between a vehicle side panel and a side wall of a bed liner.
Figure 8:
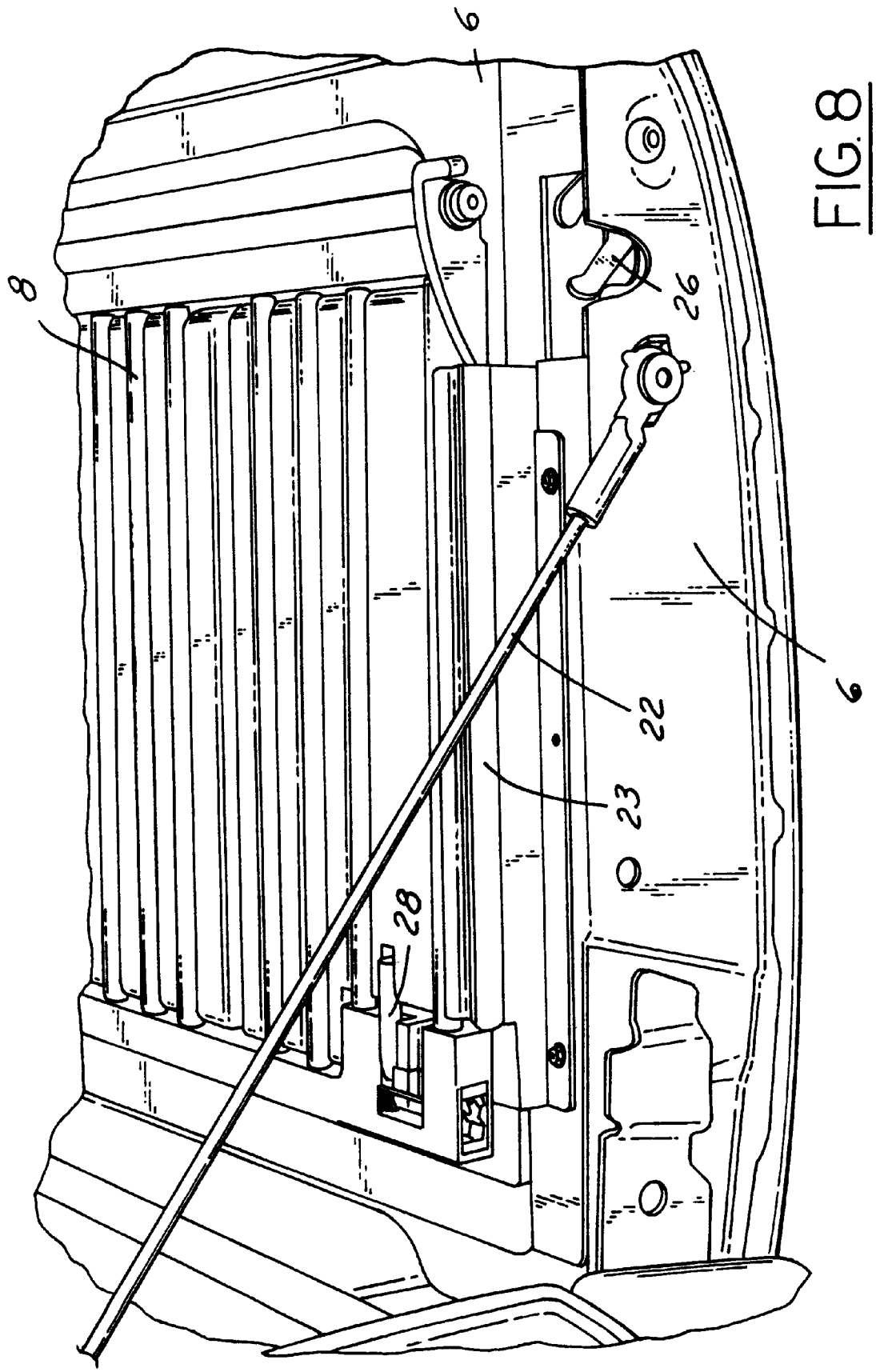
FIG. 8 is a perspective side view of the vehicle tailgate in the unlatched position with the rear enclosure member in a flat position.

As seen in FIGS. 7 and 8, handles 16 are provided on rear ends 57 of side enclosures 10 to allow an operator to easily grasp and move side enclosures 10 from the stowed position to the extended position. Tailgate cable 22 provides support for tailgate 6 when in the unlatched position, connecting tailgate 6 to side wall 4. When in the vertical, latched position, tailgate 6 is releasably held by tailgate latch 26 (FIG. 8) grasping a striker 24 (FIG. 7) in a known fashion. The additional convenience of tie-down lines 18 connected to a hook 20 may also be added to allow a large object, such as a motorcycle, to be securely transported. A locking pin device 28 secures the rear enclosure member 8 in the flat position to the tailgate 6 (FIG. 8).

Figure 12:
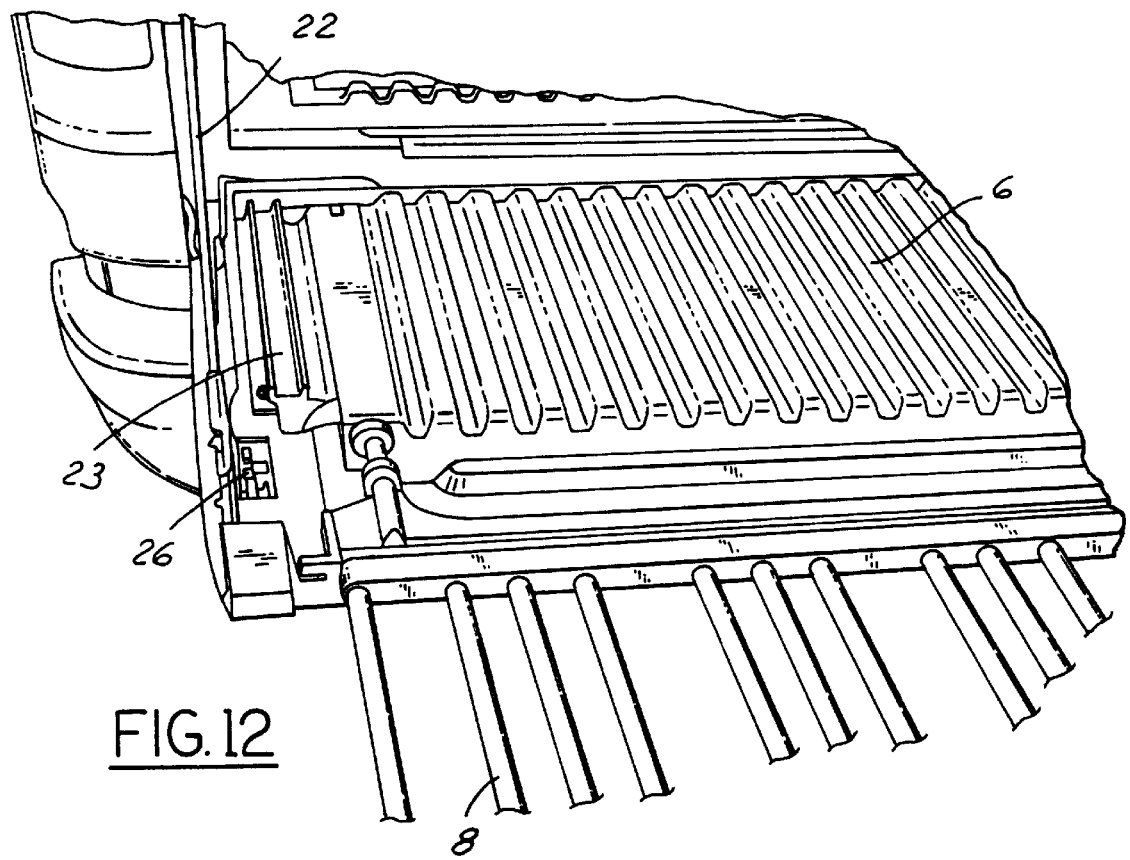
FIG. 12 is a fragmentary view of the tailgate in an unlatched position showing the rear enclosure member between an upright position and a load position to allow access to the vehicle bed.
Figure 13:
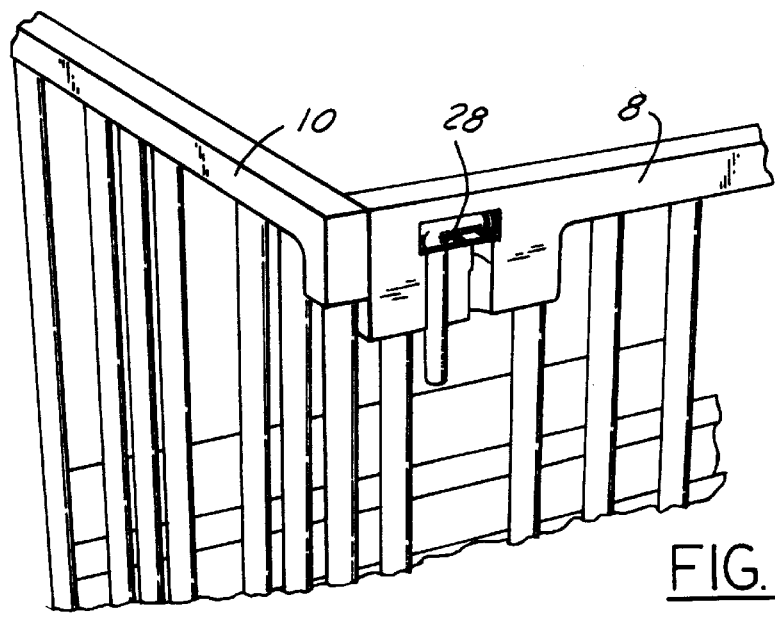
FIG. 13 is a partial perspective view of an upper rear corner of an extended bed of a preferred embodiment of the present invention showing a connecting device for attaching the rear enclosure member to a side enclosure member.
Figure 15:
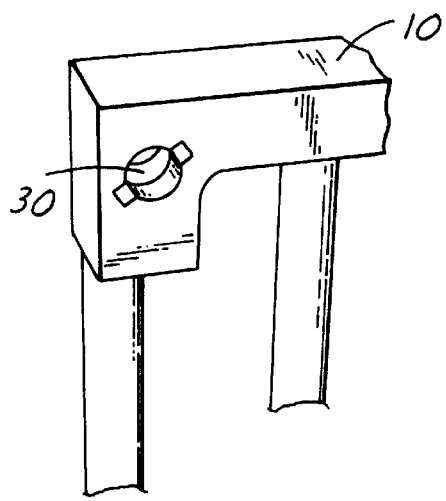
FIG. 15 is a view of an attachment hole on the side enclosure members provided for the insertion of the connecting device.
Figure 14:
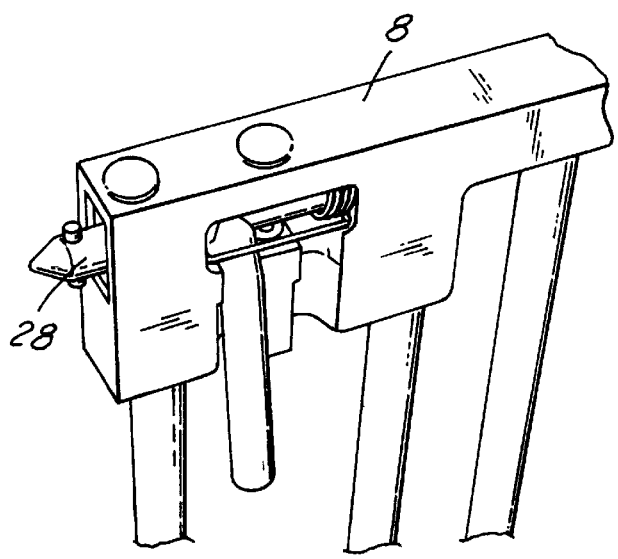
FIG. 14 is a view of the connecting device disposed near the corner of the rear enclosure member.
Figure 16:
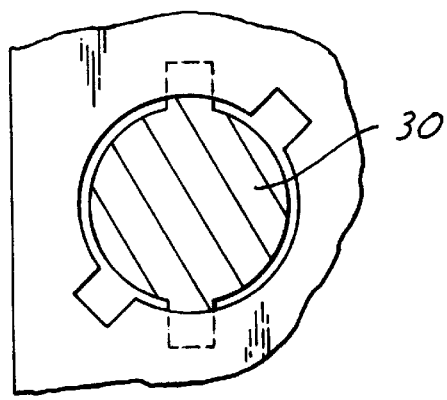
FIG. 16 is a sectional view taken along line 16—16 of FIG. 13.

Referring now to FIG. 12, rear enclosure member 8, when moving between the flat position, the upright position, the load position, rotates around an axis defined by pins on two corners of rear enclosure member 8, which are connected to tailgate 6. This axis can be moved laterally by releasing these pins by a number of devices known in the art. This then allows rear enclosure member 8 to swing to a position hanging from tailgate 6 to allow more convenient access to the vehicle bed for loading cargo.

Turning now to FIGS. 13–16, rear enclosure member 8 is releasably connected to side enclosure members 10 by means of a locking pin device 28 and a corresponding locking socket 30. Locking pin devices 28 are disposed near the corners of rear enclosure member 8, while locking sockets 30 are disposed near the corner of side enclosure members 10. Through the insertion of locking pins 28 into the appropriate locking sockets 30, and rotation of locking pins 28, side enclosure members 10 can be secured in their extended positions and releasably attached to rear enclosure member 8.

Figure 17:
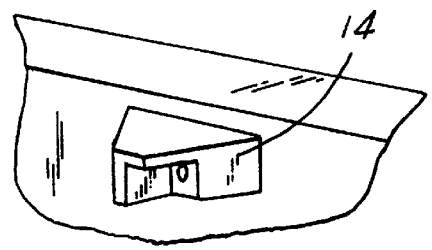
FIG. 17 is an enlarged view of the circled area 14 of FIG. 3 showing a retaining device disposed on an inner surface of the side wall of the vehicle bed to retain the divider in the dividing position.
Figure 19:
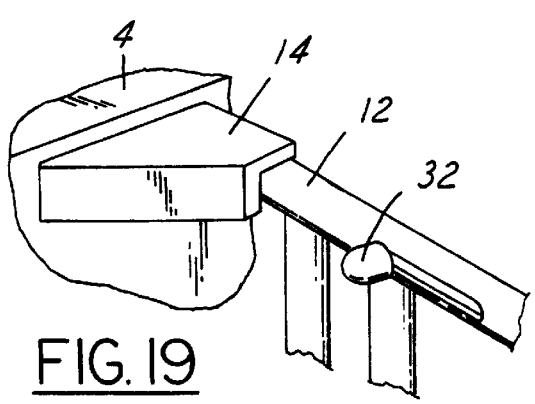
FIGS. 18 and 19 show front and rear views, respectively, of the divider in the upright position latched into the retaining device.
Figure 18:
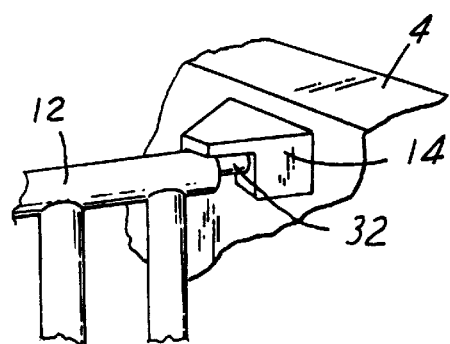

Turning finally to FIGS. 17–19, divider retaining devices 14, disposed on side walls 4, halt the rotation of divider 12 from the flat position when it is in the upright position. Divider pin devices 32, disposed near the corners of divider 12, can then be partially inserted into divider retaining devices 14. This effectively maintains the divider's 12 vertical orientation, causing it not only to be attached to flatbed 2, but also to side walls 4. The divider 12 can then securely divide the vehicle bed 1 into two separate storage areas. Preferably, the divider 12 is made of a rectangular frame with generally longitudinally extending bars, similar to the rear enclosure 8.

As is known in the art, the vehicle bed extender and divider of the present invention is typically utilized behind a cab 9 of a pickup truck, but can be used with other vehicles having a bed for carrying cargo. Preferably, the vehicle bed 1 has a bed liner 65, perhaps made of a hard plastic, along the inner surface thereof, including the flatbed, the side walls, and the front wall, in addition to the tailgate as previously discussed. The side enclosure members 10 can be encased within side portions 67 of the bed liner when in the stowed position (FIG. 7).

Variations and modifications to the present invention will, no doubt, occur to those skilled in the art. The present invention has been described with reference to a pick-up truck. However, the same principles can be applied to other vehicles having defined cargo spaces or the like. It is the following claims, including all equivalents, which define the scope of our invention.

What is claimed is:

1. A vehicle bed comprising, in combination:
   a generally horizontal, longitudinally extending flatbed bounded by a pair of opposed side walls on transversely opposite sides of the flatbed, defining lateral boundaries of said vehicle bed;
   a tailgate rotatably disposed to allow access to an interior of said vehicle bed by moving from a generally vertical latched position to a rearwardly projecting, generally horizontal unlatched position;
   a rear enclosure member disposed on said tailgate and movable to an upright position generally perpendicular to said tailgate when said tailgate is in the unlatched position;
   two side enclosure members movable between a stowed position housed within said side walls and a deployed position rearwardly extending from the side walls when the tailgate is in the unlatched position for connection to the rear enclosure member so as to create an extended enclosed area for said vehicle bed, wherein said tailgate has a corrugated inner liner and said rear enclosure member is intertwined therewith when in the flat position; and
   connection means for connecting said rear enclosure member to said two side enclosure members.

2. A vehicle bed as recited in claim 1 wherein said rear enclosure member swings between the upright position and a flat position lying generally parallel to said tailgate on an axis defined near an upper edge thereof.

3. A vehicle bed as recited in claim 2 wherein said rear enclosure member is releasably secured when in the upright position and when in the flat position.

4. A vehicle bed as recited in claim 1 wherein said side enclosure members are releasably secured when in the deployed position and when in the stowed position.

5. A vehicle bed as recited in claim 1 wherein said rear enclosure member and said two side enclosure members have spaced bars.

6. An extension assembly for a vehicle bed defined by a generally horizontal longitudinally extending flatbed bounded by a pair of opposed side walls on transversely opposite sides of the flatbed, and a tailgate rotatably disposed to allow access to an interior of said vehicle bed by moving from a generally vertical latched position to a rearwardly projecting generally horizontal unlatched position, the side walls and tailgate defining boundaries of said vehicle bed when said tailgate is in the latched position, the extension assembly comprising in combination:
   a rear enclosure member disposed on said tailgate for movement between a tailgate plane position mated with and generally parallel to an inner side of the tailgate, an upright position generally perpendicular to and upwardly extending from said tailgate when said tailgate is in the unlatched position, and a load position generally perpendicular to and downwardly extending from said tailgate when said tailgate is in the unlatched position;
   a pair of side enclosure members movable between a stowed position housed within said side walls and a deployed position rearwardly extending from the side walls when the tailgate is in the unlatched position for connection to the rear enclosure member so as to create an extended enclosed area for said vehicle bed
   wherein each of said pair of side walls has track means disposed therein for slidably receiving said pair of side enclosure members when in the stowed position, and said tailgate has a pair of tailgate tracks which extend longitudinally when the tailgate is in the unlatched position for slidably receiving the side enclosure members when in the deployed position.

7. A vehicle bed as recited in claim 6, wherein said rear enclosure member is releasably secured when in the upright position and when in the flat position.

8. An extension assembly as recited in claim 6, wherein said rear enclosure member and said side enclosure members are comprised of spaced bars.

9. A vehicle bed comprising, in combination:
   a generally horizontal, longitudinally extending flatbed bounded by a pair of opposed side walls on transversely opposed sides of the flatbed, defining lateral boundaries of said vehicle bed;
   a tailgate rotatably disposed to allow access to an interior of said vehicle bed by moving from a generally vertical latched position to a rearwardly projecting, generally horizontal unlatched position;
   a rear enclosure member disposed on said tailgate and movable to an upright position generally perpendicular to said tailgate when in the unlatched position;
   two side enclosure members movable between a stowed position, wherein each of the two side enclosure members is encased separately within one of the pair of opposed side walls, and a deployed position rearwardly extending out of the side walls when the tailgate is in the unlatched position for connection to the rear enclosure member so as to create an extended enclosed area for said vehicle bed; and
   at least one connection mechanism for connecting the rear enclosure member to the two side enclosure members.

* * * * *